United States Patent
Chen et al.

(10) Patent No.: US 12,346,452 B2
(45) Date of Patent: Jul. 1, 2025

(54) VERIFYING THE TRUSTWORTHINESS OF WEB APPLICATIONS

(71) Applicant: Google LLC, Mountain View, CA (US)

(72) Inventors: John Bradley Chen, Los Gatos, CA (US); Jason Jeffrey Miller, Somerville, MA (US); Gang Wang, Jersey City, NJ (US)

(73) Assignee: Google LLC, Mountain View, CA (US)

( * ) Notice: Subject to any disclaimer, the term of this patent is extended or adjusted under 35 U.S.C. 154(b) by 224 days.

(21) Appl. No.: 17/798,154

(22) PCT Filed: Jan. 20, 2021

(86) PCT No.: PCT/US2021/014118
§ 371 (c)(1),
(2) Date: Aug. 8, 2022

(87) PCT Pub. No.: WO2022/159085
PCT Pub. Date: Jul. 28, 2022

(65) Prior Publication Data
US 2023/0102116 A1    Mar. 30, 2023

(51) Int. Cl.
*G06F 21/00* (2013.01)
*G06F 21/51* (2013.01)
(Continued)

(52) U.S. Cl.
CPC .......... *G06F 21/577* (2013.01); *G06F 21/51* (2013.01); *G06F 21/602* (2013.01); *G06F 21/64* (2013.01);
(Continued)

(58) Field of Classification Search
CPC ...... G06F 21/577; G06F 21/51; G06F 21/602; G06F 21/64; G06F 2221/033;
(Continued)

(56) References Cited

U.S. PATENT DOCUMENTS 8,533,803 B2 * 9/2013 Cha ............. H04W 12/069
726/8
2011/0321168 A1 * 12/2011 Amit ............. H04L 63/168
726/26
(Continued)

FOREIGN PATENT DOCUMENTS

EP         2882156        6/2015
JP       2007-527147      9/2007
(Continued)

OTHER PUBLICATIONS

Developer.mozilla.org [online], "<iframe>: The Inline Frame element" Aug. 2013, retrieved on Nov. 9, 2022, retrieved from URL <https://developer.mozilla.org/en-US/docs/Web/HTML/Element/iframe>, 8 pages.
Developer.mozilla.org [online], "<script>: The Script element" Aug. 2013, retrieved on Nov. 9, 2022, retrieved from URL <https://developer.mozilla.org/en-US/docs/Web/HTML/Element/script>, 6 pages.
(Continued)

*Primary Examiner* — Mahfuzur Rahman
(74) *Attorney, Agent, or Firm* — Fish & Richardson P.C.

(57) ABSTRACT

This disclosure relates to verifying the trustworthiness of web applications. In one aspect, a method includes obtaining, by a browser of a client device, an electronic resource comprising code for a web application. The browser renders the electronic resource, including processing the code of the web application. The code causes the browser to initiate a request to a remote server. In response to processing the code, the request is generated and modified to include at least a portion of an integrity element for the web application. The modified request is sent to the remote server. A response to the request is received from the remote server. The response is based on the remote server verifying that the web application is trustworthy using the integrity element. Data is displayed based on the response.

19 Claims, 6 Drawing Sheets

(51) Int. Cl.
    *G06F 21/57* (2013.01)
    *G06F 21/60* (2013.01)
    *G06F 21/64* (2013.01)

(52) U.S. Cl.
    CPC   *G06F 2221/033* (2013.01); *G06F 2221/2119* (2013.01)

(58) Field of Classification Search
    CPC ........... G06F 2221/2119; G06F 21/645; H04L 9/0643; H04L 9/3236; H04L 9/3247; H04L 9/3297; H04L 63/123; H04L 63/126; H04L 9/3226
    See application file for complete search history.

(56) References Cited

U.S. PATENT DOCUMENTS

| | | | | |
|---|---|---|---|---|
| 2012/0072979 | A1* | 3/2012 | Cha | H04W 12/069 726/8 |
| 2012/0210435 | A1* | 8/2012 | Niemela | G06F 21/645 726/26 |
| 2012/0324242 | A1* | 12/2012 | Kirsch | G06Q 20/405 713/189 |
| 2014/0282978 | A1* | 9/2014 | Lerner | H04L 63/083 726/7 |
| 2016/0066189 | A1* | 3/2016 | Mahaffey | H04W 12/12 455/405 |
| 2022/0200796 | A1* | 6/2022 | Robison | G06F 9/45558 |
| 2022/0200806 | A1* | 6/2022 | Grobelny | H04L 9/0643 |
| 2022/0201009 | A1* | 6/2022 | Dhoble | H04L 41/0895 |

FOREIGN PATENT DOCUMENTS

| | | |
|---|---|---|
| JP | 2019-502997 | 1/2019 |
| KR | 10-2012-0025066 | 3/2012 |
| KR | 10-2019-0127124 | 11/2019 |

OTHER PUBLICATIONS

Developer.mozilla.org [online], "Subresource Integrity" Sep. 2015, retrieved on Nov. 9, 2022, retrieved from URL <https://developer.mozilla.org/en-US/docs/Web/Security/Subresource_Integrity>, 4 pages.
Developer.mozilla.org [online], "Using the Fetch API" May 2015, retrieved on Nov. 9, 2022, retrieved from URL <https://developer.mozilla.org/en-US/docs/Web/API/Fetch_API/Using_Fetch>, 10 pages.
Github.com [online], "Privacy Budget" Aug. 2019, retrieved on Nov. 9, 2022, retrieved from URL <https://github.com/mikewest/privacy-budget>, 4 pages.
Github.com [online], "Trust Token API" Aug. 2019, retrieved on Nov. 9, 2022, retrieved from URL <https://github.com/WICG/trust-token-api>, 13 pages.
Github.com [online], "Webpackage" Oct. 2016, retrieved on Nov. 9, 2022, retrieved from URL <https://github.com/WICG/webpackage>, 4 pages.
Guides.criteotilt.com [online], "Criteo Integration Guide" Mar. 2021, retrieved on Nov. 9, 2022, retrieved from URL <https://guides.criteotilt.com/CDB 2.0/CDB 2.0_generic/>, 3 pages.
International Search Report and Written Opinion in International Appln. No. PCT/US2021/014118, dated Oct. 5, 2021, 13 pages.
Reactjs.org [online], "React : A JavaScript library for building user interfaces" Nov. 2013, retrieved on Nov. 9, 2022, retrieved from URL <https://reactjs.org/>, 5 pages.
International Preliminary Report on Patentability in International Appln. No. PCT/US2021/014118, mailed on Aug. 3, 2023, 7 pages.
Notice of Allowance in Japanese Appln. No. 2022-550983, mailed on Jan. 15, 2024, 5 pages (with English translation).
Office Action in Japanese Appln. No. 2022-550983, mailed on Oct. 2, 2023, 8 pages (with English translation).
Office Action in Korean Appln. No. 10-2022-7028601, mailed on Sep. 24, 2024, 15 pages (with English translation).
Notice of Allowance in Korean Appln. No. 10-2022-7028601, mailed on May 8, 2025, 5 pages (with English translation).

* cited by examiner

VERIFYING THE TRUSTWORTHINESS OF WEB APPLICATIONS

CROSS-REFERENCE TO RELATED APPLICATIONS

This application is a National Stage Application under 35 U.S.C. § 371 and claims the benefit of International Application No. PCT/US2021/014118, filed Jan. 20, 2021, the entirety of which is incorporated herein by reference.

TECHNICAL FIELD

This specification is related to web application security.

BACKGROUND

Web applications, which are also referred to as web apps, are applications that run within web browsers. A web application can be constructed using scripts, Hypertext Markup Language (HTML), Cascading Style Sheets (CS S), and/or other web technologies. Web applications typically interact with a corresponding web server by sending requests, e.g., Hypertext Transfer Protocol HTTP requests.

SUMMARY

In general, one innovative aspect of the subject matter described in this specification can be embodied in methods that include obtaining, by a browser of a client device, an electronic resource comprising code for a web application; rendering, by the browser, the electronic resource, including processing the code of the web application, wherein the code causes the browser to initiate a request to a remote server; in response to processing the code: generating the request; modifying the request to include at least a portion of an integrity element for the web application; and sending the modified request to the remote server; receiving, from the remote server, a response to the request based on the remote server verifying that the web application is trustworthy using the integrity element; and displaying data based on the response. Other implementations of this aspect include corresponding apparatus, systems, and computer programs, configured to perform the aspects of the methods, encoded on computer storage devices.

These and other implementations can each optionally include one or more of the following features. In some aspects, modifying the request to include the integrity element comprises inserting the portion of the integrity element into a header of the request.

In some aspects, the electronic resource includes the integrity element. Some aspects can include, in response to processing the code, verifying, by the browser, that the web application is trustworthy based at least in part on the code and the integrity element for the web application. The request can be generated in response to verifying that the web application is trustworthy. The integrity element for the web application can include an integrity attribute specifying (i) a cryptographic hash function and (ii) a trusted cryptographic hash calculated using the cryptographic hash function and trusted code of the web application.

Verifying, by the browser, that the web application is trustworthy based at least in part on the code and the integrity element for the web application can include calculating, by the browser and using the cryptographic hash function, a cryptographic hash of the code for the web application obtained by the browser; determining that the calculated cryptographic hash matches the trusted cryptographic hash by comparing the calculated cryptographic hash to the trusted cryptographic hash; and verifying, by the browser, that the web application is trustworthy in response to determining that the calculated cryptographic hash matches the trusted cryptographic hash. The portion of the integrity element can include the trusted cryptographic hash.

In some aspects, the integrity element includes a signed approval element comprising a set of integrity data and a digital signature generated based on the set of integrity data, The set of integrity data can include a trusted cryptographic hash calculated using a cryptographic hash function and trusted code of the web application, an identify of a trusted signer, and a timestamp indicating a time at which the digital signature is generated. The portion of the integrity element can include the set of integrity data and the digital signature.

In some aspects, modifying the request includes inserting, into the request, data identifying a context in which the code is embedded. The data identifying the context in which the code is embedded includes at least one of (i) attributes of a frame of the electronic resource in which the code is embedded or a cryptographic hash of the attributes of the frame.

In some aspects, the integrity element includes a digital signature of a web package that includes components of the web application and data identifying the web package. The integrity element for the web application can include an integrity attribute specifying (i) a cryptographic hash function and (ii) a trusted cryptographic hash calculated using the cryptographic hash function and a trusted asset of the web application. The trusted asset can include an image, logo, or other asset of the web application.

When a web application sends a request, e.g., an HTTP request to a server, e.g., a web server, the entity that owns or operates the server may want the server to evaluate the trustworthiness of the calling web application. For example, the entity may want to confirm that the code initiating the request was served by the intended domain, that the code has not been modified, and that extensions are not changing the code's behavior. The entity may also want the server to understand and/or respond to the presence of and context of frames, e.g., iframes, in which the code is embedded. This can ensure that the web application is not being used fraudulently and/or that the code of the web application has not been modified.

The subject matter described in this specification can be implemented in particular embodiments so as to realize one or more of the following advantages. The trustworthiness of web applications can be verified by a web server prior to providing a response to a request initiated by the web application to ensure that the response is being provided to a trustworthy web application rather than a modified, fraudulent, and/or malicious version of the web application. A chain of trust can be established for the web application, the browser in which the web application is rendered, and the client device on which the browser is running, which ensures that all components involved in generating and transmitting the request are trustworthy and not fraudulent or compromised. This ensures the integrity of the information in the request, and ensures that responses to the requests are not being used for fraudulent or malicious purposes.

The techniques for verifying the trustworthiness of web applications described in this document can reduce the amount of time required to perform the verification. For example, using, as integrity elements, signed approval elements that include digital signatures for sets of integrity information, the verification of a web application can be performed by a server in less than 0.15 milliseconds (ms). This enables the verification to be used in speed critical applications, such as providing content in response to a request or user interaction with an electronic resource, e.g., web page, that includes the web application. Providing quick responses also prevents errors from occurring within the web applications, e.g., due to waiting for a response from a server that is taking too long to complete a verification process.

By having web applications securely convey their trustworthiness to the web server, the web server can verify the trustworthiness of the web applications without limiting developers' capability to develop web applications and without degrading user's experience with legitimate web applications.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

In general, this document describes systems and techniques for verifying the trustworthiness of web applications. A web server can verify the trustworthiness of a web application in response to receiving a request from the web application. In this way, the web server can ensure that the web application is trustworthy prior to providing a response to the request.

The server can verify the trustworthiness of a web application using an integrity element included with the request. The integrity element can have different forms or data structures, but each one can be used to verify the trustworthiness of the web application alone or in combination with other information. For example, the server can also verify that the request originated from an appropriate origin, which can be the domain of the electronic resource (e.g., web page) that includes the web application. In another example, the server can verify that the context in which the web application is rendered is an appropriate or common context. Although the techniques are described in terms of a web browser and web applications, similar techniques can be used to verify the integrity of embedded applications in other contexts, e.g., in native applications developed for particular platforms or particular devices.

Figure 1:
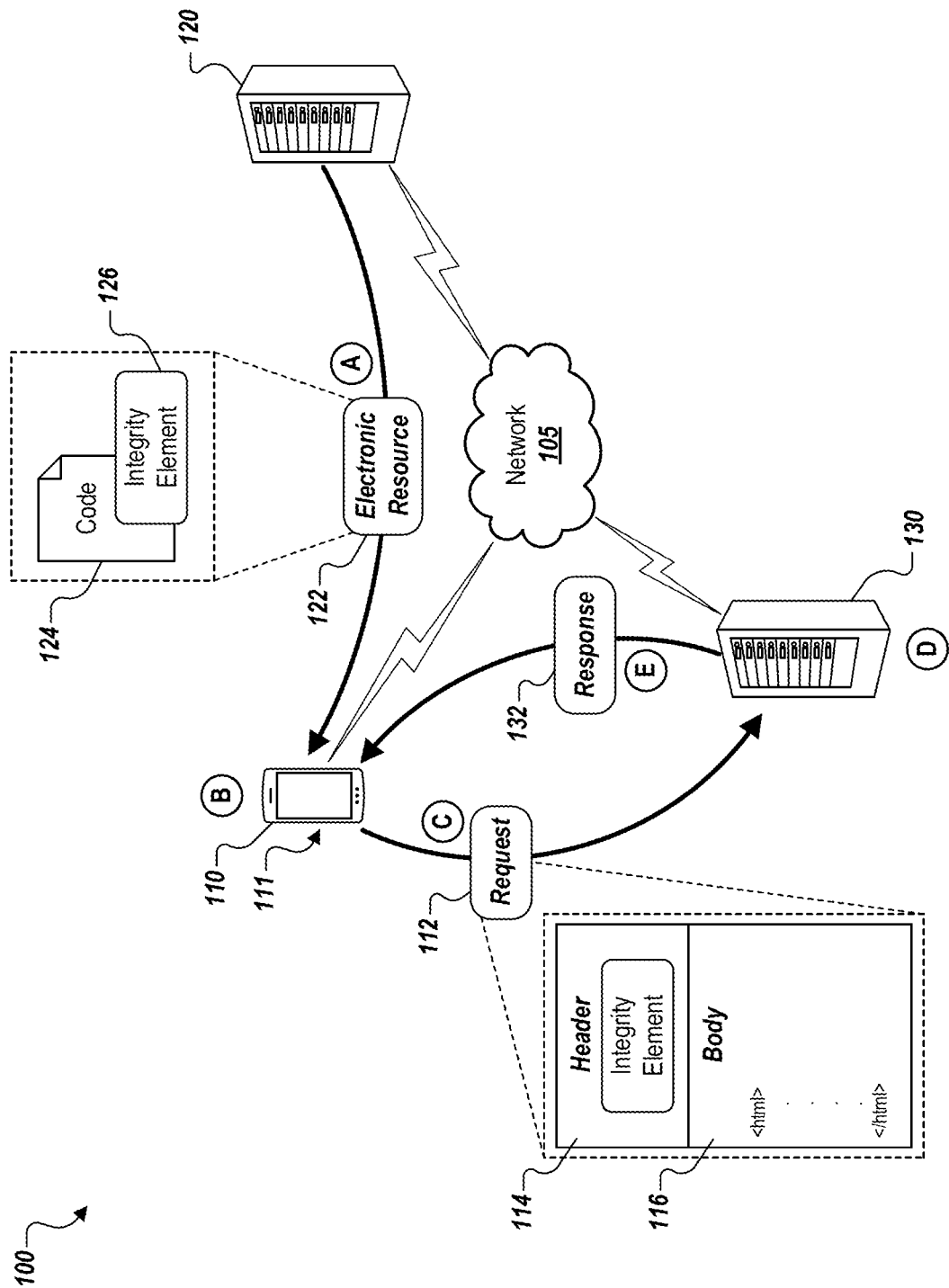
FIG. 1 shows an environment in which the trustworthiness of web applications is verified.

FIG. 1 shows an environment 100 in which the trustworthiness of web applications is verified. The example environment 100 includes a data communication network 105, such as a local area network (LAN), a wide area network (WAN), the Internet, a mobile network, or a combination thereof. The network 105 connects the client devices 110, content management systems 120, and web servers 130. Although referred to as web servers, the web servers 130 can be implemented using other types of computing systems but are referred to as web servers that interact with web applications embedded in electronic resources.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming system, or a virtual reality system.

A client device 110 typically includes applications, such as web browsers 111 and/or native applications, to facilitate the sending and receiving of data over the network 105. A native application is an application developed for a particular platform or a particular device (e.g., mobile devices having a particular operating system).

A content management system 120 can include servers that provide electronic resources in response to requests received from browsers 111. The content management system 120 can host websites of a publisher. A website includes one or more electronic resources associated with a domain name and hosted by one or more servers of the content management system 120. An example website is a collection of web pages formatted in hypertext markup language (HTML) that can contain text, images, and/or multimedia content. An electronic resource can also include one or more web applications constructed with scripts, HTML, Cascading Style Sheets (CS S), browser extensions, or other web technology. Each website is maintained by a content publisher, which is an entity that controls, manages and/or owns the website.

A resource is any data that can be provided by the publisher over the network 105, and can be associated with a resource address. Resources include HTML pages, word processing documents, and portable document format (PDF) documents, images, video, and feed sources, to name just a few. The resources can include content, such as words, phrases, pictures, and so on, and may include embedded information (such as metadata and hyperlinks) and/or embedded instructions (e.g., scripts).

The web servers 130 can receive and respond to requests from web applications. For example, some functionality of a web application can involve tasks performed at a remote server that is remote from the client device 110 on which the web application is being processed, e.g., being executed. The web application can initiate a request and the browser 111 can send the request to the web server(s) 130 corresponding to the web application. The web servers 130 can interact with application servers that perform the tasks and provide a response to the browser 111 which, in turn, provides a response to the web application. The web application can then render content within the browser based on the response, display data verifying that an action was performed in response to the request, or perform some other action based on the response.

The web servers 130 can verify the trustworthiness of a web application that initiated a request prior to acting on the request and/or providing a response to the request. For example, the web servers can ensure that the web application has at least a threshold trustworthiness based on one or more integrity signals. An example process for verifying the trustworthiness of a web application is described below with reference to stages A-E.

In some implementations, the web servers 130 can establish a chain of trust that indicates the trustworthiness of two or more of: the web application, the trustworthiness of the browser 111 that is processing/rendering the web application, and the trustworthiness of the client device 110 on which the web browser is being executed. For example, the web server 130 can receive, from the browser 111 data that can be used to verify the trustworthiness of each of these components. If the web server 130 cannot verify the trustworthiness of any one of the components, the web server 130 can elect to not respond to the request, or determine a modified response that is different from the response that the web application would provide if all components were verified as being trustworthy.

During stage A, the browser obtains an electronic resource 122 from a content management system 120. The electronic resource 122, which can be a web page, includes code 124 and an integrity element 126. The code 124 can be code of a web application included in, e.g., embedded in, the electronic resource 122. For example, the code 124 can include scripts included between script tags, e.g., <script src="url"></script>, in an HTML document. Some electronic resources can include multiple scripts or other code elements for one or more web applications.

The electronic resource 122 can include a respective integrity element 126 for each of one or more code elements. For example, if the web application includes multiple scripts, the electronic resource 122 can include a respective integrity element 126 for each individual script.

Although the techniques described in this document are described largely in terms of integrity elements for code of a web application, the same or similar techniques can be used to verify that other assets of the web application have not been modified and therefore the web application is trustworthy. For example, the electronic resource 122 can include a respective integrity element for each asset, e.g., each code element, each image, each logo, etc. By verifying that code elements (e.g., HTML, CSS, scripts), images and/or logos have not been modified, the web server 130 can verify that the look and feel of the web application has not been modified.

The integrity element 126 can take one of various forms described in this document. In one example, the integrity element can include, or be in the form of, an integrity attribute that specifies a cryptographic hash function and a trusted cryptographic hash calculated using the cryptographic hash function and trusted code of the web application. This trusted cryptographic hash is an expected hash value that should result from the browser 111 and/or the web server 130 calculating a hash value using the cryptographic hash function and the actual code 124 received with the electronic resource 122. The cryptographic hash for a code element can be referred to as the identity of the code element. The cryptographic hash function can be one or various hash functions of choice, such as, for example, SHA256.

In another example, the integrity element for the code 124 can include a signed approval element that includes a set of integrity data and a digital signature generated based on the set of integrity data. The signed approval element can be generated by a trusted signer, as described below with reference to FIG. 3. The set of integrity data can include a trusted cryptographic hash calculated using a cryptographic hash function and trusted code of the web application, an identity of the trusted signer, and a timestamp indicating a time at which the digital signature is generated. The identity of the trusted signer can be based on a domain of the trusted signer, e.g., an eTLD+1 of the trusted signer domain. The eTLD+1 is the effective top-level domain (eTLD) plus one level more than the public suffix. An example eTLD+1 is "example.com" where ".com" is the top-level domain.

The timestamp can indicate a date and/or time at which the digital signature is generated. For example, the timestamp can be the date, a date and hour, or higher resolution (e.g., to the second). In another example, the timestamp can indicate a number of days since epoch or some specified date. The digital signature can be generated using a private key of the trusted signer and the set of integrity data so that any modification of the set of data can be detected if verification of the digital signature fails using the public key corresponding to the private key.

In another example, the web application can be distributed as a web package that bundles all assets (e.g., HTML, CSS, scripts, images, etc.) of the web application into a single file that can be easily distributed. Such files can be digitally signed by the developer of the web application or another appropriate entity. This enables the web server to validate the actual identity of the code 124 delivered by the web package in addition to its origin. In this example, the integrity element can be the digital signature of the web package.

During stage B, the browser 111 renders the electronic resource 122. When the browser 111 renders the code 124 of the web application, the code 124 can instruct the browser 111 to send a request 112 to the web server 130 in stage C. In implementations in which the integrity element includes a trusted cryptographic hash of trusted code of the application, the browser 111 can optionally verify that the code 124 included in the electronic resource 122 is trustworthy prior to generating and sending the request. This can include extracting the identity of the cryptographic hash function and the trusted cryptographic hash from the integrity element 126, calculating a cryptographic hash of the code 124 included in the electronic resource 122 with the extracted cryptographic hash function, and comparing the calculated cryptographic hash to the trusted cryptographic hash. If the two hashes match, the trustworthiness of the code 124 is successfully verified and the browser 111 can generate and send the request. If the two hashes do not match, the browser 111 can block the request 112, e.g., not send the request 112, or the browser 111 can stop rendering the code 124 of the web application.

In stage C, the browser 111 generates the request 112 and transmits the request 112 to the web server 130 corresponding to the web application. Generating the request 112 can include modifying the request 112 to include the integrity element 126 or at least a portion of the integrity element 126 for the code 124, e.g., the individual code element that initiated the request. For example, the browser 111 can modify the request 112 to include the cryptographic hash of the code 124 of the web application that initiated the request 112, to include the signed approval element for the code 124 that initiated the request, or to include the digital signature of the web package, depending on the form of the integrity element 126. In implementations in which the integrity element includes a cryptographic hash of the code 124, the browser 111 can send this cryptographic hash even when the electronic resource 122 does not include an integrity attribute that includes the trusted cryptographic hash. Instead, the browser can generate and send a cryptographic hash of the code 124 using the appropriate cryptographic hash function, e.g., a pre-specified hash function or a hash function identified by the electronic resource 111 or the code 124. In this way, the web server can still know the identity of the code 124 that generated the request 112 and use the cryptographic hash of the code 124 to determine whether the code 124 is trustworthy.

If the electronic resource includes the integrity attribute and assuming the trusted cryptographic hash of the integrity attribute matches the cryptographic hash computed by the browser 111, the browser 111 can insert either of the two hash values into the request 112. As shown in FIG. 1, the browser 111 can insert the integrity element, or the portion of the integrity element into the header 114 of an HTTP request that also includes a body 116 with additional information for the request 112, e.g., the purpose of the request 112, data to be used in processing the request 112, etc. As described in more detail below, the browser 111 can insert additional integrity information into the request 112, e.g., into the header 114, that can be used to verify the trustworthiness of the web application.

During stage D, the web server 130 processes the request 112. Processing the request 112 can include verifying the trustworthiness of the web application that initiated the request. The techniques in which the web server 130 verifies the request 112 can vary based on the form of the integrity element 126 and/or the additional integrity information included in the request 112. Example techniques for verifying the trustworthiness of a web application are described in more detail below.

During stage E, the web server 130 can respond, or not respond, to the request 112 based on whether the trustworthiness of the web application is verified successfully. If the trustworthiness of the web application is verified successfully, the web server 130 can process the request 112 and respond to the request 112 in a normal manner, e.g., by providing content for display at the browser 111. If the trustworthiness of the web application is not verified successfully, the web server 130 can ignore the request 112 or respond to the browser 111 with a response indicating that the web application 111 is not trustworthy. If the browser 111 receives a response, the browser 111 can display content at the display of the client device 110 based on the response.

Figure 2:
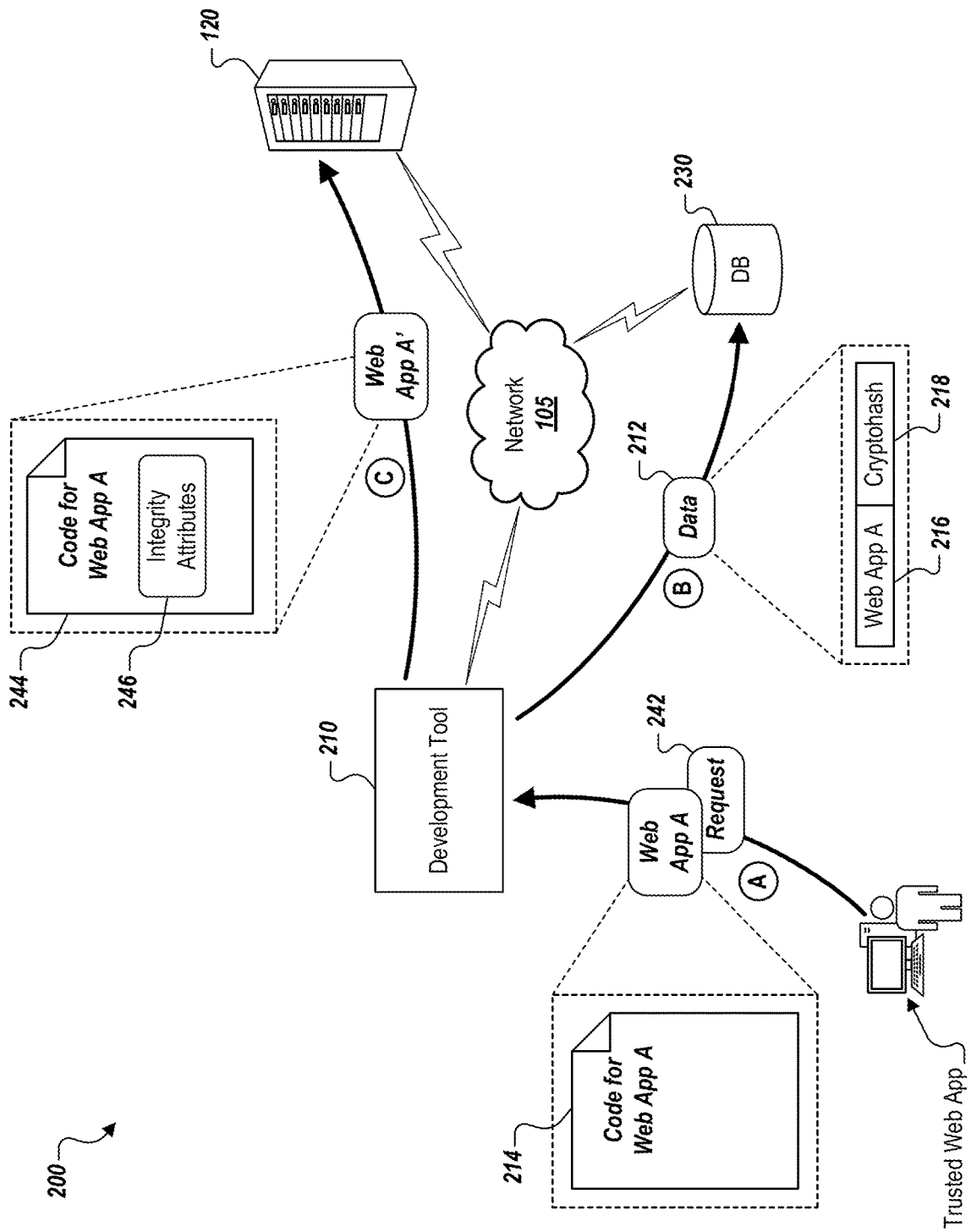
FIG. 2 shows an environment in which web applications with integrity elements are uploaded for distribution to client devices.

FIG. 2 shows an environment 200 in which web applications with integrity elements are uploaded for distribution to client devices. In this example, the integrity element includes an integrity attribute that specifies a cryptographic hash function and a trusted cryptographic hash calculated using the cryptographic hash function and trusted code of the web application.

During stage A, a trusted web application publisher 240 uses a development tool 210 to develop a web application (i.e., web application A). The development tool 210 can be implemented as a computer with software that enables users to develop and publish web applications. For example, the development tool 210 can be a cloud-based or local software development platform. The web application includes code 214, e.g., scripts, HTML, CSS, etc., that, when executed by a client device, implements the functionality of the web application. The web application can also include other assets, e.g., images, logos, etc. This code 214 can be considered trusted code as it is the original code and has not had an opportunity to be modified by a malicious party. Similarly, the assets can be considered trusted assets. After developing the web application, the web application publisher 240 generates a request 242 that requests that the development tool 210 publish the web application.

During stage B, the development tool 210 calculates a cryptographic hash of the code 214 and/or other assets using a cryptographic hash function. If the web application includes multiple code elements, e.g., multiple scripts, the development tool 210 can calculate a respective cryptographic hash of each code element using the cryptographic hash function. As the cryptographic hash(es) are calculated using trusted code, the cryptographic hash(es) can be referred to as trusted cryptographic hash(es).

The development tool 210 can send, to a trusted code database 230, a data element 212 for the code 214 and/or other asset. The data element 212 can include a unique identifier 216 for the web application and the cryptographic hash 218 of the code. If the web application includes multiple code elements, the development tool 210 can send a respective data element 212 for each code element. The trusted code database 230 can store trusted cryptographic hashes for code and/or other assets of web applications so that web servers can verify the trustworthiness of the web applications, as described in more detail below.

The development tool 210 can also update web application A to include an integrity element for the code 214 and/or other asset. In this example, the integrity element is an integrity attribute 246. The development tool 210 can insert the integrity attribute 246 into the code 214, resulting in updated code 244. For example, if the code 214 is one or more scripts, the development tool 210 can update the script tags to include the integrity attribute 246 that specifies the cryptographic hash function and the trusted cryptographic hash. In this example, the development tool 210 can update the code 214 to include, in each script tag of the updated code 244, the integrity attribute 216 for the script in the script tag. The executable code of the web application can remain the same in the updated web application.

During stage C, the development tool 210 sends the updated web application to a content management system 120 so that the updated web application is available for inclusion in electronic resources. In this way, when an electronic resource includes the updated web application, the electronic resource includes the integrity attribute(s) for the code 244 and/or other assets of the web application. Stages B and C can be completely transparent to the trusted web application publisher 240.

Figure 3:
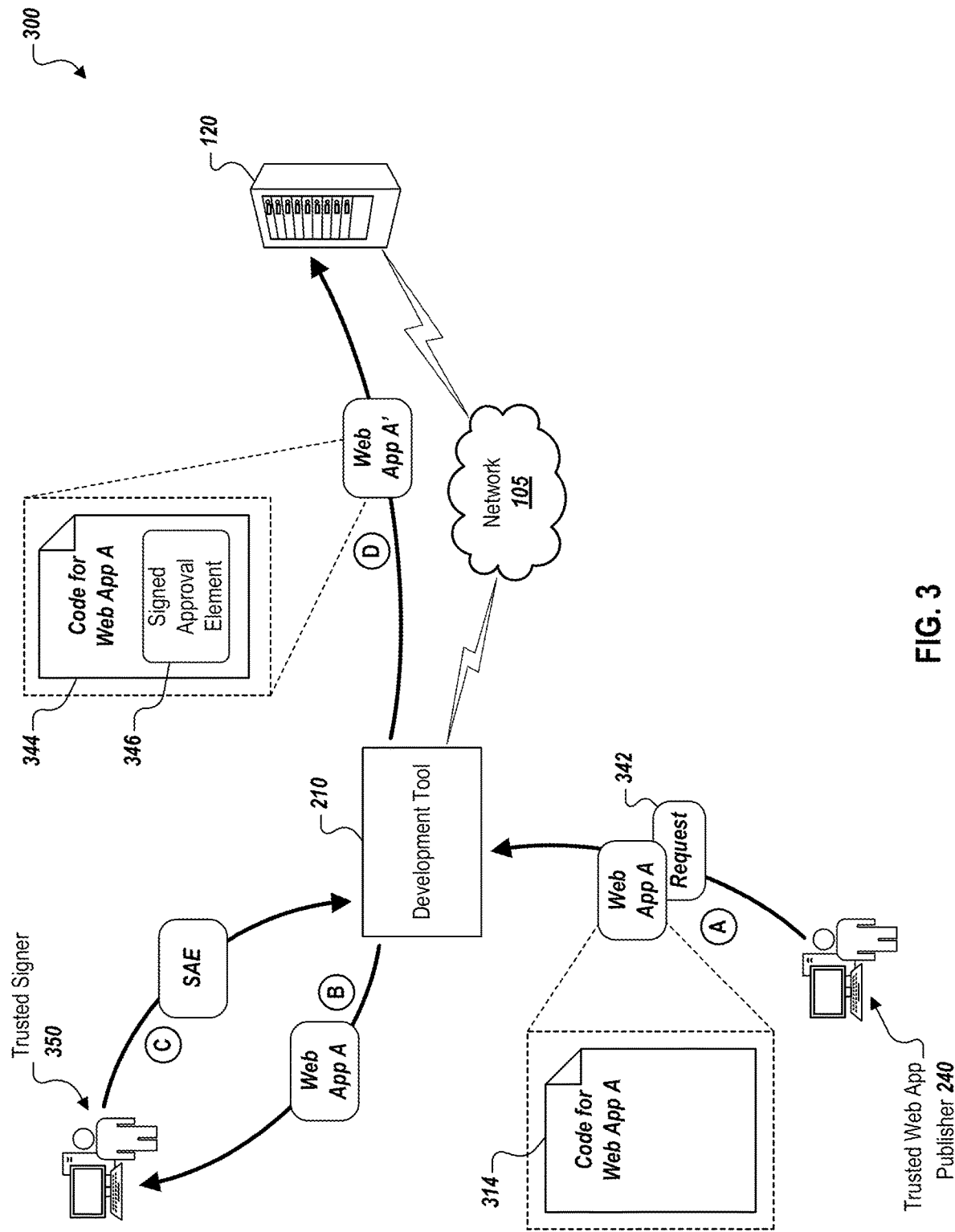
FIG. 3 shows an environment in which web applications with integrity elements are uploaded for distribution to client devices.

FIG. 3 shows an environment 300 in which web applications with integrity elements are uploaded for distribution to client devices. In this example, the integrity element includes a signed approval element.

During stage A, a trusted web application publisher 240 uses a development tool 210 to develop a web application (i.e., web application A). The web application includes code 314, e.g., scripts, HTML, CSS, etc., that, when executed by a client device, implements the functionality of the web application, and/or other assets. This code 314 (i.e., analogous to code 214 in FIG. 2) and/or other assets can be considered trusted as it is the original code or assets and has not had an opportunity to be modified by a malicious party. After developing the web application, the web application publisher 240 generates a request 342 that requests that the development tool 210 publish the web application.

During stage B, the development tool 210 sends the code 314 and/or other assets of the application to a trusted signer 350 for review. The trusted signer 350 can be a third party computer of a trusted third party that evaluates code and/or other assets and, if the code or other assets is/are trustworthy, generates a signed approval element for the code or other assets. The trusted third party can be a party that has expertise in evaluating code, e.g., a computer/network security software company or anti-virus developer, a trusted web application publisher, or an industry regulatory agency, or another appropriate party different from the trusted web application publisher 240 and publishers of electronic resources. This evaluation can include, for example, scanning the code for viruses, spyware, and/or other malware or malicious code. In some implementations, the trusted web application publisher 240 can act as the trusted signer 350 to self-sign the web application.

During stage C, the trusted signer 350 can evaluate each code element (or other asset) of the code 314 and generate a signed approval element for each code element (or other asset) that is deemed trustworthy. The trusted signer 350 can generate a signed approval element for a code element, e.g., script, by calculating a cryptographic hash of the code element using a cryptographic hash function. This cryptographic hash can be the same as the trusted cryptographic hash of the integrity attribute described above. As this cryptographic hash is calculated using the trusted code of the web application, this cryptographic hash can be referred to as a trusted cryptographic hash.

The trusted signer 350 can generate the signed approval element for a code element by generating a data structure, e.g., a composite message, that includes a set of integrity data and a digital signature generated based on the set of integrity data. As described above, the set of integrity data can include the trusted cryptographic hash of the code element, an identity of the trusted signer 350, and a timestamp indicating a time at which the digital signature is generated. The trusted signer 350 can generate the digital signature by signing over the set of data using a private key of the trusted signer 350. The digital signature can later be verified using a public key that corresponds to, e.g., is mathematically linked to, the private key. The trusted signer provides each signed approval element to the development tool 210.

During stage D, the development tool 210 updates web application A to include, as an integrity element, the signed approval element(s). The development tool 210 can insert the integrity attribute 216 into the code 314, resulting in updated code 344. For example, if the code 314 is one or more scripts, the development tool 210 can update the script tags to include a new attribute that includes the signed approval element for the script. In this example, the development tool 210 can update the code 314 to include, in each script tag of the updated code 344, the signed approval element for the script in an attribute of the script tag. The executable of the web application can remain the same in the updated web application. The signed approval element(s) of the web application can be used to verify the trustworthiness of the web application, as described in more detail below.

The development tool 210 sends the updated web application to a content management system 120 so that the updated web application is available for inclusion in electronic resources. In this way, when an electronic resource includes the updated web application, the electronic resource includes the integrity attribute(s) for the code 344 (i.e., analogous to code 244 in FIG. 2) of the web application. Stages B-D can be completely transparent to the trusted web application publisher 240.

Figure 4:
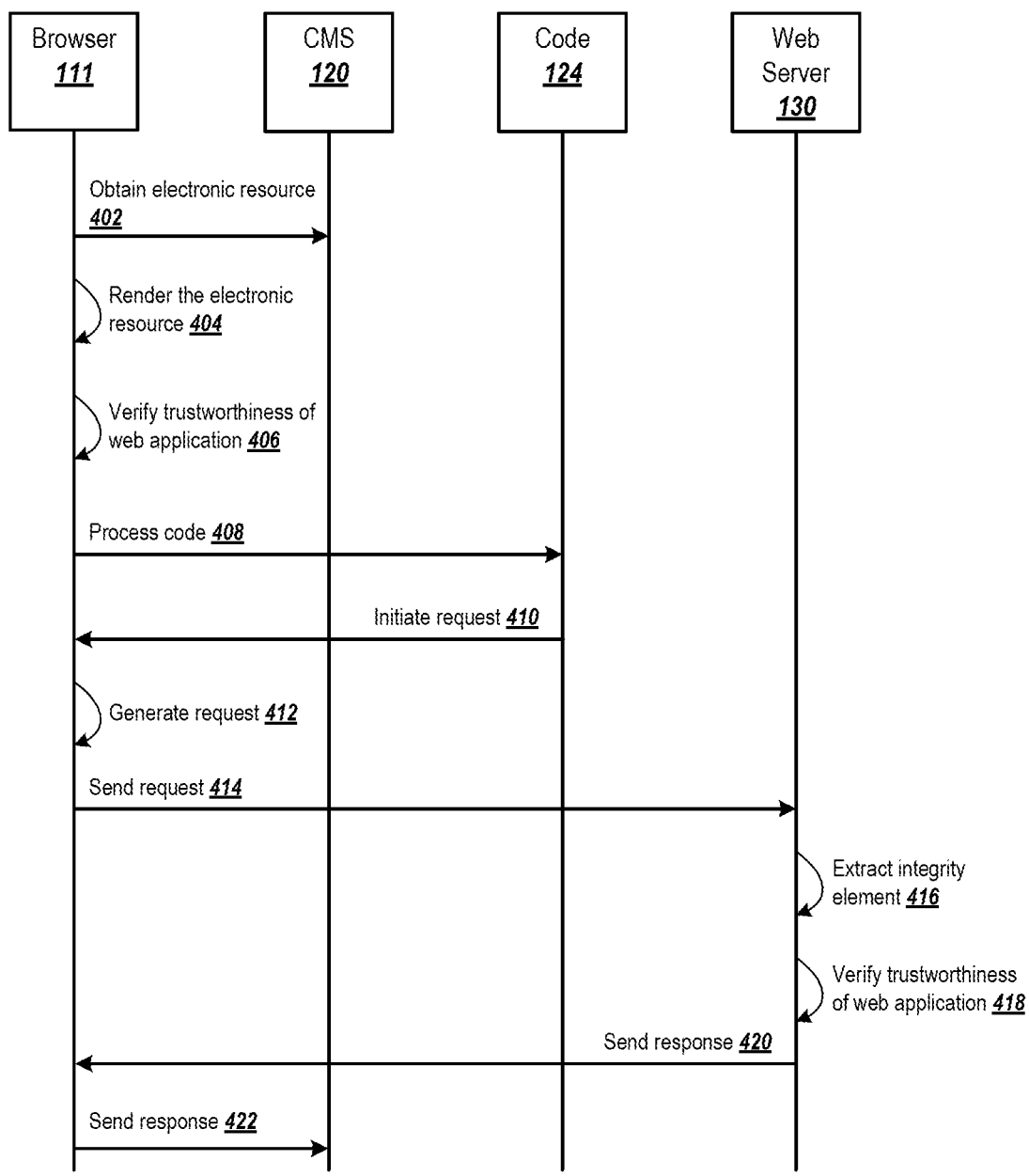
FIG. 4 is a swim lane diagram that illustrates an example process for verifying the trustworthiness of a web application.

FIG. 4 is a swim lane diagram that illustrates an example process 400 for verifying the trustworthiness of a web application. Operations of the process 400 can be implemented, for example, by a browser 111 of a client device 110, a content management system (CMS) 120, code 124 of a web application and a web server 130. Operations of the process 400 can also be implemented as instructions stored on one or more computer readable media which may be non-transitory, and execution of the instructions by one or more data processing apparatus can cause the one or more data processing apparatus to perform the operations of the process 400.

Although the process 400 is described in terms of verifying the trustworthiness of a web application based on code of the application, the process 400 can be used to verify the trustworthiness of the web application based on other assets, e.g., images and/or logos, of the web application. For example, the process 400 can be used to determine whether any of these assets have been modified since an integrity element was generated for the asset. Thus, in the description that follows, the term code can be replaced with asset to refer to other assets of the web application.

The browser 111 obtains an electronic resource (402). The browser 111 can obtain the electronic resource from a content management system 120 that hosts websites. For example, the browser 111 can request a web page from the content management system 120 in response to a user interacting with a link to the web page or the user entering a Universal Resource Locator (URL) for the web page into the browser 111. The electronic resource can include a web application.

The electronic resource can also include, for code of the web application, one or more integrity elements. For example, the electronic resource can include an integrity element for each code element (or other elements, e.g., images/logo) of the web application. As described above, the integrity element can be an integrity attribute, a signed approval element, or a digital signature of a web package.

The browser 111 renders the electronic resource (404). The browser 111 can display content of the electronic resource on a display of the client device 110. To render the electronic resource, the browser 111 can process the electronic resource, e.g., process code of the electronic document. For example, the electronic resource can be an HTML document with HTML code that also includes scripts (or other code) for a web application. When processing the HTML of the electronic resource, the browser 111 can identify code 124 of the application, e.g., within script tags or other appropriate tags of the electronic resource.

The browser 111 verifies the trustworthiness of the code 124 of the web application (406). This can be an optional step performed by the browser 111. For example, some electronic resources may not include a cryptographic hash of trusted code of the web application. The browser 111 can verify the trustworthiness of the code 124 using an integrity element for the code 124 that is included in the electronic resource. For example, as described above, the integrity element can include a trusted cryptographic hash of the trusted code of the web application. To verify the trustworthiness of the code 124, the browser 111 can use the same hash function that was used to calculate the trusted cryptographic hash to calculate a cryptographic hash of the actual code of the web application received with the electronic resource. The browser can then compare the trusted cryptographic hash to the calculated cryptographic hash. If the two hashes match, the browser 111 can determine that the code 124 of the web application is trustworthy. If the two hashes do not match, the browser 111 can determine that the code 124 of the web application is not trustworthy. If the code is deemed trustworthy, the browser 111 can process the code and send requests to the web server on behalf of the web application. If the code is determined to not be trustworthy, the browser 111 can decline to process the code and/or decline to send a request to the web server 130 on behalf of the code of the web application. The browser 111 can verify the trustworthiness of each code element of the web application included in the electronic resource.

The browser 111 processes the code of the web application (408). For example, the browser 111 can read the code and perform one or more actions based on the code. One such action is generating and sending a request to the web server 130. The request can be for content based on a user interaction with the web application rendered by the browser 111.

The code 124 initiates a request (410). The code 124 can initiate a request to the web server 130 by instructing the browser 111 to generate and send a request to the web server 130.

The browser 111 generates the request (412). The browser 111 can generate a request that includes data and/or instructions for the web server 130. For example, the request can include data describing a user interaction with the web application for which a response from the web server 130 is required in order to respond to the user interaction. The request can be an HTTP request.

The browser 111 can modify the request to include the integrity element (or at least a portion of the integrity element) for the code 124 that initiated the request. The browser 111 can insert the integrity element or the portion of the integrity element into the header of the request. If the integrity element is an integrity attribute, the browser 111 can include the trusted cryptographic hash of the trusted code of the application in the request. If the integrity element is a signed approval element, the browser 111 can insert the signed approval element into the request. If the integrity element is a signed web package, the browser can insert the digital signature of the signed web package into the request.

The browser 111 can also insert, into the request, additional integrity information that can be used to verify the trustworthiness of the web application. The additional integrity information can include an origin of the web application. The origin can be the domain of the electronic resource that includes the web application. For example, if the web application is embedded in a web page corresponding to example.com, the origin can be example.com. This enables the web server 130 to verify that the web application is included in an appropriate electronic resource. In some implementations, the origin of the web application can be Universal Resource Identifier (URI) or URL.

The additional integrity information can include data identifying a context for the code 124. The data identifying the context for the code 124 can include attributes of a frame, e.g., an iframe, of the electronic resource in which the code is nested. For example, a web application can be nested within a particular iframe of a web page. This can be an important signal to establish the trust of the code 124. For example, the code may commonly be nested within particular iframes. If the code 124 is nested within a rare or new iframe, the web application may not be trustworthy.

The code 124 can instruct the browser 111 to collect this context information and insert the information into the request, e.g., into the header of the request. The information can include the nested iframe elements, e.g., only the value of the src attribute of those elements. In some implementations, the browser 111 can calculate a cryptographic hash of the context information using a cryptographic hash function and insert the cryptographic hash into the request. In this way, the web server 130 can compare the cryptographic hash to previous cryptographic hashes for the context in which the code 124 was nested.

The browser 111 sends the modified request to the web server 130 (414). The web server 130 extracts the integrity element (or the portion of the integrity element included in the request) from the request (416). For example, the web server 130 can extract the integrity element from the header of the request. If included in the request, the web server 130 can also extract the context information and/or the origin of the web application.

The web server 130 verifies the trustworthiness of the web application (418). The web server 130 can verify the trustworthiness of the web application using the integrity element (or portion thereof) included in the request and, if included in the request, the additional integrity information, e.g., the context information and/or the origin of the web application. The techniques for verifying the trustworthiness of the web application can vary based on the form of the integrity element and the additional integrity information included in the request.

If the integrity element is an integrity attribute specifying a cryptographic hash function and a cryptographic hash, the web server 130 can query a database, e.g., the database 230 of FIG. 2, to determine whether the cryptographic hash matches a trusted cryptographic hash for the web application stored in the database. If the cryptographic hash included in the request matches a trusted cryptographic hash for the web application stored in the database, the web server 130 can determine that the web application is trustworthy. If the cryptographic hash included in the request does not match a trusted cryptographic hash for the web application stored in the database, the web server 130 can determine that the web application is not trustworthy. This signature comparison enables the web server 130 to determine whether the code of the web application has been modified from a trusted version of the code. That is, if the signature verification fails, then the code does not match the trusted code for the application. As described in more detail below, the web server 130 can also consider any additional integrity information in addition to the cryptographic hash in determining whether the web application is trustworthy.

If the integrity element is a signed approval element, the web server 130 can perform multiple steps to determine whether the web application is trustworthy. The web server 130 can determine whether the identity of the signer included in the signed approval element matches a trusted signer, e.g., in a list of trusted signers maintained by the web server 130. If so, the web application passes this verification step.

The web server 130 can also determine whether the digital signature of the signed approval element is valid. The web server 130 can determine whether the digital signature is valid using the set of data of the signed approval element and a public key corresponding to the private key used to sign the set of data. If the digital signature is valid, it means that the set of data has not changed since the digital signature was generated and, therefore, the web application passes this verification step.

The web server 130 can also determine whether the digital signature was generated within a threshold duration of time of the current time. To do this, the web server 130 can compare the timestamp of the signed approval element to a current time, e.g., the time at which the verification is being performed. If a difference between the current time and the time indicated by the timestamp is within the threshold duration, the web application passes this verification step.

If all of the verification steps succeed for the signed approval element, the web server 130 can determine that the web application is trustworthy. As described in more detail below, the web server 130 can also consider any additional integrity information in addition to the cryptographic hash in determining whether the web application is trustworthy.

Using the signed approval element can have some performance advantages over the use of an integrity attribute. For example, the web server 130 does not have to query a database to determine whether the cryptographic hash of the integrity element matches a trusted cryptographic hash for the web application. This can prevent the database from becoming a bottleneck, and therefore a source of latency, if many requests are received within a short duration of time.

If the integrity element is a digital signature of a web package, the web server 130 can verify the actual origin of the web application rather than the domain of the electronic resource with which the web application is included. In this example, the request can include the resource locator, e.g., URI or URL, of the web package so that the web server knows the identity of the web package that initiated the request. Using the resource locator, the web server can optionally download the web package to perform additional validations. The digital signature of the web application can be generated by the application publisher, which enables the web server to verify that the web application was distributed by the application publisher.

If the request includes additional integrity information, the web server 130 can determine whether the web application is trustworthy based on a combination of the integrity element and the additional integrity information. If the additional integrity information includes data identifying the origin of the web application, the web server 130 can determine whether the web application was served by an intended domain, e.g., by one of a set of intended domains. For example, a web application for displaying videos may be made available to a set of domains that are allowed to embed video playback within their electronic resources. If the origin identified by the request is not in the set of domains, the web server 130 can determine that the web application is not trustworthy. For example, to be deemed trustworthy, the web server 130 can require that the web application pass the integrity element verification and the origin verification.

If the additional integrity information includes context information, the web server 130 can compare the context information to previously received (or permissible) context information. For example, the context information can include a cryptographic hash of attributes of a frame in which the web application is nested. If this cryptographic hash does not match a cryptographic hash for a known trusted context or a common context for which at least a threshold received requests match, the web server 130 can determine that the web application is not trustworthy. If the cryptographic hash does match a cryptographic hash for a known trusted context or a common context for which at least a threshold received requests match, the web server 130 can determine that the web application is trustworthy, assuming that the integrity element was verified successfully. That is, the web server 130 can require that both the context verification and the integrity element verification succeed in order for the web application to be considered trustworthy.

In some implementations, the web server 130 can verify the integrity element, the origin, and the context in which the web application is nested. If all three verifications pass, the web server 130 can determine that the web application is trustworthy. If any verification fails, the web server 130 can determine that the web application is not trustworthy.

In some implementations, the web server 130 can determine a trustworthiness score based on one or more of the verifications. For example, the web server 130 can determine an individual score for each verification and combine the scores, optionally by weighting each score based on the importance of that verification. In this example, the score can vary based on the trustworthiness of the origin and/or the frequency at which a request is received for the web application from a context that matches the context of the request relative to the frequency at which requests are received for the web application from different contexts. For a web application, each of multiple origins can have a corresponding score based on their trustworthiness as assigned by the publisher of the web application or another entity. The web server 130 can compare the trustworthiness score to a threshold trustworthiness to determine whether the web application is trustworthy. For example, if the trustworthiness score satisfies the trustworthiness threshold, e.g., by meeting or exceeding the trustworthiness threshold, the web server 130 can determine that the web application is trustworthy.

In some implementations, the web server can verify the trustworthiness of the web application, the browser, and the client device, e.g., prior to responding to the request. For example, the web server can receive a trust token or signed redemption record for the browser and/or the client device. The token or signed redemption record can include a verdict of trustworthiness for the browser 111 and/or client device 110. The token or signed redemption record can also include a digital signature and/or additional information to ensure that the token or signed redemption record was issued by a trusted party and has not been tampered with since it was issued to the browser 111.

The web server 130 sends a response to the browser 111 (420). The web server 130 can determine an appropriate response based on whether the web application is determined to be trustworthy. If the web application is determined to be trustworthy, the web server 130 can process the request and respond to the request in a normal manner, e.g., by identifying and providing responsive content for display by the browser 111 or by providing verification that the web server 130 completed an action corresponding to the request.

If the web application is determined to not be trustworthy, the web server 130 can ignore the request or send a response to the browser 111 indicating that the web application is not trustworthy and therefore content is not being provided. The web server 130 can also maintain an audit log for web applications. For each request, the web server 130 can store, in the audit log, the integrity element of the request and data indicating whether the web application was classified as trustworthy or not trustworthy. The web server 130 can also store, in the audit log, any additional integrity information received with the request. In some implementations, the web server 130 can store only data (e.g., integrity element, trustworthy classification, and additional integrity information) for requests that are classified as being not trustworthy. The audit log enables the publisher or another party to analyze the web application(s) for fraud or misuse.

The browser 111 sends the response to the code 124 (422). In turn, the code 124 of the web application can process the response and perform an action based on the response. For example, the code 124 can cause the browser 111 to display content based on the response or display a message or other confirmation that an action was completed.

Figure 5:
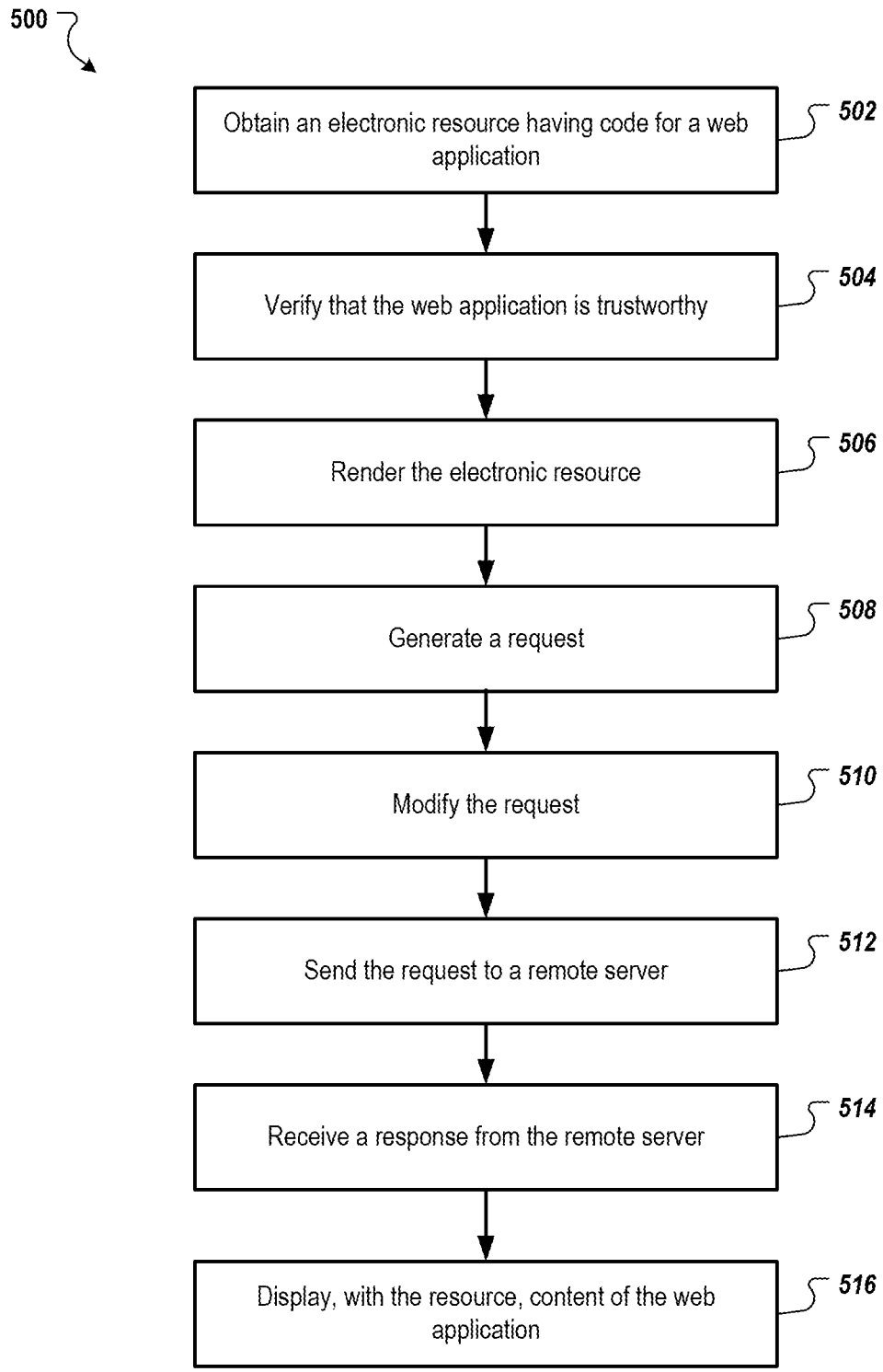
FIG. 5 is a flow diagram that illustrates an example process for verifying the trustworthiness of an application and providing a response in response to verifying the trustworthiness of the web application.

FIG. 5 is a flow diagram that illustrates an example process 500 for verifying the trustworthiness of an application and providing a response in response to verifying the trustworthiness of the web application. The example process 500 can be performed by a browser 111 of a client device 110. Operations of the process 500 can be implemented, for example, by a browser 111 of a client device 110. Operations of the process 500 can also be implemented as instructions stored on one or more computer readable media which may be non-transitory, and execution of the instructions by one or more data processing apparatus can cause the one or more data processing apparatus to perform the operations of the process 500.

Although the process 500 is described in terms of verifying the trustworthiness of a web application based on code of the application, the process 500 can be used to verify the trustworthiness of the web application based on other assets, e.g., images and/or logos, of the web application. For example, the process 500 can be used to determine whether any of these assets have been modified since an integrity element was generated for the asset. Thus, in the description that follows, the term code can be replaced with asset to refer to other assets of the web application.

An electronic resource is obtained (502). The electronic resource can include code for a web application. For example, the electronic resource can include, as one or more code elements of the web application, one or more scripts. In another example, the web application can be implemented using HTML, CSS, extensions, or another appropriate web technology. The electronic resource can include an integrity element for the code, e.g., for each of one or more individual code elements.

The trustworthiness of the web application is verified (504). This can be an optional step performed by the browser 111. For example, some electronic resources may not include a cryptographic hash of trusted code of the web application. The browser can verify that the web application is trustworthy using the integrity element and the code of the web application. For example, as described above, the integrity element can include a trusted cryptographic hash of trusted code of the application. Verifying the trustworthiness of the web application can include extracting the identity of the cryptographic hash function (if present) and the trusted cryptographic hash from the integrity element, calculating a cryptographic hash of the code included in the electronic resource, and comparing the calculated cryptographic hash to the trusted cryptographic hash. If the two hashes match, the trustworthiness of the web application is successfully verified.

The electronic resource is rendered (506). The browser can render the electronic resource, which can include displaying content of the electronic resource at a display of the client device.

A request is generated (508). The browser can generate the request in response to determining that the web application is trustworthy. For example, processing the code of the web application can result in the code initiating a request. The browser can generate a request to a web server on behalf of the web application if the web application is trustworthy.

The request is modified (510). In some implementations, the browser can modify the request in a way that is opaque to the code of the web application. The browser can modify the request by inserting the integrity element or at least a portion of the integrity element into the request. The portion can include the trusted cryptographic hash if the integrity element is an integrity attribute. The portion can include the digital signature and the URI/URL of a web package if the integrity element is associated with a web package. If the integrity element is a signed approval element, the browser can insert the signed approval element into the request. The integrity element can be inserted into the header of the request, as described above. The browser can also obtain and insert additional integrity information into the request, as described above.

The request is sent to a remote server (512). The browser can send, over a network, the modified request to a web server corresponding to the web application.

A response is received from the remote server (514). The web server can verify the trustworthiness of the web application based on the integrity element. If the web application is deemed to be trustworthy, the web server can send a response to the browser.

Data is displayed based on the response (516). The browser can pass the response received from the web server to the web application and the web application can process the response and cause the browser to display data based on the processing. This data can include, for example, content generated in response to the request or a verification message that confirms that an action was performed in response to the request.

Figure 6:
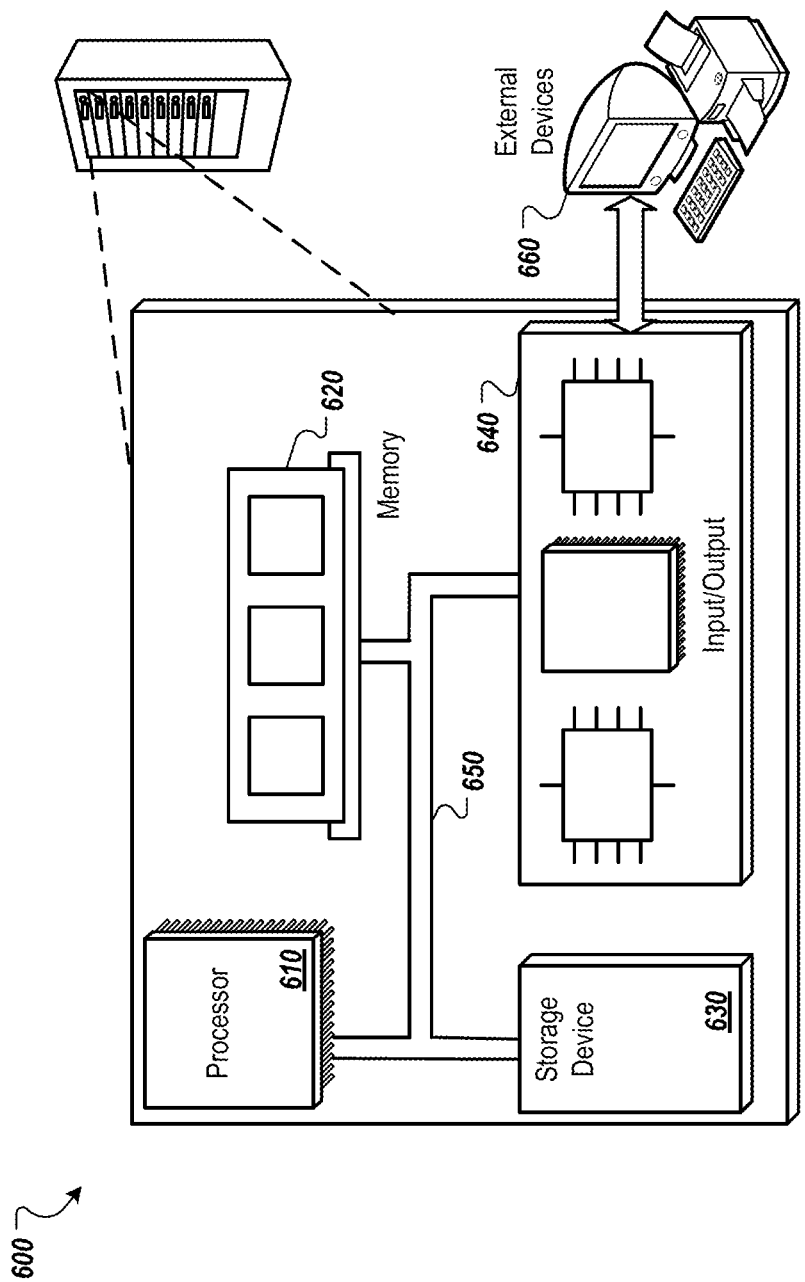
FIG. 6 is a block diagram of an example computer system.

FIG. 6 is a block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In some implementations, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In some implementations, the memory 620 is a volatile memory unit. In another implementation, the memory 620 is a non-volatile memory unit.

The storage device 630 is capable of providing mass storage for the system 600. In some implementations, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In some implementations, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to external devices 660, e.g., keyboard, printer and display devices. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
   obtaining, by a browser of a client device, an electronic resource comprising code for a web application;
   rendering, by the browser, the electronic resource, including processing the code of the web application, wherein the code causes the browser to initiate a request to a remote server;
   in response to processing the code:
      generating the request;
      modifying the request to include at least a portion of an integrity element for the web application; and
      sending the modified request to the remote server;
   receiving, from the remote server, a response to the request based on the remote server verifying that the web application is trustworthy using the integrity element; and
   displaying data based on the response,
   wherein the integrity element comprises a signed approval element comprising a set of integrity data and a digital signature generated based on the set of integrity data, wherein the set of integrity data comprises:
      a trusted cryptographic hash calculated using a cryptographic hash function and trusted code of the web application;
      an identity of a trusted signer; and
      a timestamp indicating a time at which the digital signature is generated,
      wherein the portion of the integrity element comprises the set of integrity data and the digital signature.

2. The computer-implemented method of claim 1, wherein modifying the request to include the integrity element comprises inserting the portion of the integrity element into a header of the request.

3. The computer-implemented method of claim 1, wherein the electronic resource comprises the integrity element, the method further comprising, in response to processing the code:
   verifying, by the browser, that the web application is trustworthy based at least in part on the code and the integrity element for the web application,
   wherein the request is generated in response to verifying that the web application is trustworthy.

4. The computer-implemented method of claim 3, wherein the integrity element for the web application comprises an integrity attribute specifying (i) a cryptographic hash function and (ii) a trusted cryptographic hash calculated using the cryptographic hash function and trusted code of the web application.

5. The computer-implemented method of claim 4, wherein verifying, by the browser, that the web application is trustworthy based at least in part on the code and the integrity element for the web application comprises:
   calculating, by the browser and using the cryptographic hash function, a cryptographic hash of the code for the web application obtained by the browser;
   determining that the calculated cryptographic hash matches the trusted cryptographic hash by comparing the calculated cryptographic hash to the trusted cryptographic hash; and
   verifying, by the browser, that the web application is trustworthy in response to determining that the calculated cryptographic hash matches the trusted cryptographic hash,
   wherein the portion of the integrity element comprises the trusted cryptographic hash.

6. The computer-implemented method of claim 1, wherein modifying the request further comprises inserting, into the request, data identifying a context in which the code is embedded.

7. The computer-implemented method of claim 6, wherein the data identifying the context in which the code is embedded comprises at least one of (i) attributes of a frame of the electronic resource in which the code is embedded or a cryptographic hash of the attributes of the frame.

8. The computer-implemented method of claim 1, wherein the integrity element comprises a digital signature of a web package that includes components of the web application and data identifying the web package.

9. The computer-implemented method of claim 1, wherein the integrity element for the web application comprises an integrity attribute specifying (i) a cryptographic hash function and (ii) a trusted cryptographic hash calculated using the cryptographic hash function and a trusted asset of the web application, wherein the trusted asset comprises an image, logo, or other asset of the web application.

10. A system comprising:
one or more processors; and
one or more storage devices storing instructions that, when executed by the one or more processors, cause the one or more processors to perform operations comprising:
obtaining, by a browser of a client device, an electronic resource comprising code for a web application;
rendering, by the browser, the electronic resource, including processing the code of the web application, wherein the code causes the browser to initiate a request to a remote server;
in response to processing the code:
generating the request;
modifying the request to include at least a portion of an integrity element for the web application; and
sending the modified request to the remote server;
receiving, from the remote server, a response to the request based on the remote server verifying that the web application is trustworthy using the integrity element; and
displaying data based on the response,
wherein the integrity element comprises a signed approval element comprising a set of integrity data and a digital signature generated based on the set of integrity data, wherein the set of integrity data comprises:
a trusted cryptographic hash calculated using a cryptographic hash function and trusted code of the web application;
an identity of a trusted signer; and
a timestamp indicating a time at which the digital signature is generated,
wherein the portion of the integrity element comprises the set of integrity data and the digital signature.

11. The system of claim 10, wherein modifying the request to include the integrity element comprises inserting the portion of the integrity element into a header of the request.

12. The system of claim 10, wherein the electronic resource comprises the integrity element, the operations further comprising, in response to processing the code:
verifying, by the browser, that the web application is trustworthy based at least in part on the code and the integrity element for the web application,
wherein the request is generated in response to verifying that the web application is trustworthy.

13. The system of claim 12, wherein the integrity element for the web application comprises an integrity attribute specifying (i) a cryptographic hash function and (ii) a trusted cryptographic hash calculated using the cryptographic hash function and trusted code of the web application.

14. The system of claim 13, wherein verifying, by the browser, that the web application is trustworthy based at least in part on the code and the integrity element for the web application comprises:
calculating, by the browser and using the cryptographic hash function, a cryptographic hash of the code for the web application obtained by the browser;
determining that the calculated cryptographic hash matches the trusted cryptographic hash by comparing the calculated cryptographic hash to the trusted cryptographic hash; and
verifying, by the browser, that the web application is trustworthy in response to determining that the calculated cryptographic hash matches the trusted cryptographic hash,
wherein the portion of the integrity element comprises the trusted cryptographic hash.

15. The system of claim 10, wherein modifying the request further comprises inserting, into the request, data identifying a context in which the code is embedded.

16. The system of claim 15, wherein the data identifying the context in which the code is embedded comprises at least one of (i) attributes of a frame of the electronic resource in which the code is embedded or a cryptographic hash of the attributes of the frame.

17. The system of claim 10, wherein the integrity element comprises a digital signature of a web package that includes components of the web application and data identifying the web package.

18. A non-transitory computer readable storage medium carrying instructions that, when executed by one or more processors, cause the one or more processors to perform operations comprising:
obtaining, by a browser of a client device, an electronic resource comprising code for a web application;
rendering, by the browser, the electronic resource, including processing the code of the web application, wherein the code causes the browser to initiate a request to a remote server;
in response to processing the code:
generating the request;
modifying the request to include at least a portion of an integrity element for the web application; and
sending the modified request to the remote server;
receiving, from the remote server, a response to the request based on the remote server verifying that the web application is trustworthy using the integrity element; and
displaying data based on the response,
wherein the integrity element comprises a signed approval element comprising a set of integrity data and a digital signature generated based on the set of integrity data, wherein the set of integrity data comprises:
a trusted cryptographic hash calculated using a cryptographic hash function and trusted code of the web application;
an identity of a trusted signer; and
a timestamp indicating a time at which the digital signature is generated,
wherein the portion of the integrity element comprises the set of integrity data and the digital signature.

19. A computer-implemented method comprising:
obtaining, by a browser of a client device, an electronic resource comprising (i) code for a web application and (ii) an integrity element for the web application, wherein the integrity element for the web application comprises an integrity attribute specifying (i) a cryptographic hash function and (ii) a trusted cryptographic hash calculated using the cryptographic hash function and trusted code of the web application;

rendering, by the browser, the electronic resource, including processing the code of the web application, wherein the code causes the browser to initiate a request to a remote server;

in response to processing the code:
- verifying, by the browser, that the web application is trustworthy based at least in part on the code and the integrity element for the web application, including:
  - calculating, by the browser and using the cryptographic hash function, a cryptographic hash of the code for the web application obtained by the browser;
  - determining that the calculated cryptographic hash matches the trusted cryptographic hash by comparing the calculated cryptographic hash to the trusted cryptographic hash; and
  - verifying, by the browser, that the web application is trustworthy in response to determining that the calculated cryptographic hash matches the trusted cryptographic hash;
- generating the request in response to verifying that the web application is trustworthy;
- modifying the request to include at least a portion of the integrity element for the web application, wherein the portion of the integrity element comprises the trusted cryptographic hash; and
- sending the modified request to the remote server;

receiving, from the remote server, a response to the request based on the remote server;

verifying that the web application is trustworthy using the integrity element; and displaying data based on the response.

* * * * *